No. 760,974. PATENTED MAY 24, 1904.
G. W. DYARMAN & J. H. PERRIN.
CORNER STAY FOR BOXES, &c.
APPLICATION FILED APR. 3, 1903.

NO MODEL.

George W. Dyarman.
James H. Perrin.
INVENTORS.

WITNESSES:
Brennan West.
C. V. Gilmartin.

BY D. E. Foulds
ATTORNEY.

No. 760,974.

Patented May 24, 1904.

UNITED STATES PATENT OFFICE.

GEORGE W. DYARMAN AND JAMES H. PERRIN, OF COLUMBUS, OHIO, ASSIGNORS, BY DIRECT AND MESNE ASSIGNMENTS, TO SAID DYARMAN, HENRY H. DEWEY, OF CLEVELAND, OHIO, AND COLONEL E. BRIGHT, OF COLUMBUS, OHIO.

CORNER-STAY FOR BOXES, &c.

SPECIFICATION forming part of Letters Patent No. 760,974, dated May 24, 1904.

Application filed April 3, 1903. Serial No. 150,998. (No model.)

*To all whom it may concern:*

Be it known that we, GEORGE W. DYARMAN and JAMES H. PERRIN, citizens of the United States, residing at Columbus, in the county of Franklin and State of Ohio, have invented a new and useful Improvement in Corner-Stays for Boxes and the Like, of which the following is a specification.

This invention relates to boxes and like articles, and has particular reference to the form of corner-stay employed in the construction of the same.

Figure 1:
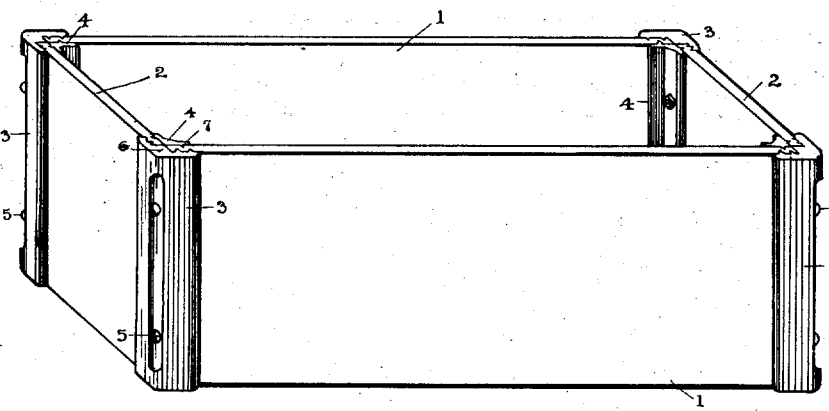
Figure 2:
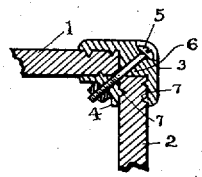

In the accompanying drawings, forming a part of this application, Figure 1 is a perspective view of a box having our improved form of corner-stay applied thereto, and Fig. 2 is a transverse section through the corner-stay.

The object of this invention is the production of a box that is especially adapted for shipping purposes, the same being so strongly built that it will not be damaged by such use.

In the drawings, in which similar reference characters designate corresponding parts in both the views, 1 represents the sides of a box, and 2 the ends thereof. These parts are held together by means of corner-stays, the outer portions of which are shown at 3.

As appears most clearly from Fig. 2, the sides and ends of the box are secured to the portions 3 of the corner-stay by the inner portions 4, which portions are made angular in shape and are held to the outer portions by bolts or screws 5.

In assembling the box the side and end pieces 1 and 2 are placed in the angular recesses of the portions 3, said recesses being formed by providing the outer portion with an inwardly-extending angular projection 6, said projection being by preference substantially right angular in cross-section, so that the ends and side pieces may squarely abut the same. Of course the angular projection may be placed on the inner portion of the stay, if preferred. After the sides and ends are in position the inner portions are applied, and by tightening the bolts or screws the two portions of the stays are drawn together and the sides and ends securely clamped. To prevent the sides and ends from being torn apart, we form the adjacent surfaces of the parts 3 and 4 with longitudinal ridges 7, which indent the said sides and ends, and thus prevent them from moving in their stays. These ridges, of which there may be any desired number, extend throughout the length of the stay and are preferably staggered, so that those on the outer part will not be opposite those on the inner part. As shown on the drawings, these ridges are considerably exaggerated in size.

Having thus described our invention, what we claim as new, and desire to secure by Letters Patent, is—

1. A box, a corner-stay therefor formed of an outer and an inner angular portion, said portions embracing the adjacent ends of the side and end pieces and the outer portion having an inwardly-extending angular projection against which the said pieces abut, bolts or screws for drawing the said portions together to clamp the said pieces, and ridges arranged on the adjacent faces of the said portions, said ridges being staggered in position.

2. A box, a corner-stay therefor formed of an outer and an inner angular portion, said portions embracing the adjacent ends of the side and end pieces, an angular projection extending from one of said portions against which the ends of the side and end pieces abut, bolts or screws for drawing the said portions together to clamp the said pieces, and ridges arranged on the adjacent faces of the said portions, said ridges being staggered in position.

3. A box having the adjacent edges of the side and end pieces substantially square or unbeveled, a corner-stay for the said side and end pieces, said stay having an outer and an inner angular portion between which the adjacent ends of the said pieces are clamped, an inwardly-extending angular projection on the said outer portion against which the said square edges of the said pieces abut, and bolts or screws for drawing the said portions together to clamp the said pieces.

4. A box, a corner-stay therefor formed of an outer and an inner angular portion, said portions embracing the adjacent ends of the side and end pieces, a projection on one of said portions, said projection extending between the ends of the side and end pieces so as to substantially reach the other portion, and a bolt or screw passing through the said portions and the said projection to draw the said portions together.

5. A box having the adjacent edges of the side and end pieces substantially square or unbeveled, a corner-stay for the said side and end pieces, said stay having an outer and an inner angular portion between which the adjacent ends of the said pieces are clamped, an inwardly-extending angular projection on the said outer portion, against which the said square edges of the said pieces abut, said projection extending substantially to the inner portion of the corner-stay, and bolts or screws for drawing the said portions together to clamp the said pieces.

6. A box having the adjacent edges of the side and end pieces substantially square or unbeveled, a corner-stay for the said side and end pieces, said stay having an outer and an inner angular portion between which the adjacent ends of the said pieces are clamped, an inwardly-extending angular projection on the said outer portion against which the said square edges of the said pieces abut, bolts or screws for drawing the said portions together to clamp the said pieces, and ridges arranged on the adjacent faces of the said portions, said ridges being staggered in position.

In testimony whereof we affix our signatures in the presence of two witnesses.

GEORGE W. DYARMAN.
JAMES H. PERRIN.

Witnesses:
I. K. DAVIS,
MORA D. BARBER.

---

Correction in Letters Patent No. 760,974.

It is hereby certified that Letters Patent No. 760,974, granted May 24, 1904, upon the application of George W. Dyarman and James H. Perrin, of Columbus, Ohio, for an improvement in "Corner-Stays for Boxes, etc.," was erroneously issued to said Dyarman, Henry H. Dewey, and Colonel E. Bright, whereas said Letters Patent should have been issued to *said Henry H. Dewey and Colonel E. Bright, as sole owners of said invention*, as shown by the record of assignments in this office; and that the said Letters Patent should be read with this correction therein that the same may conform to the record of the case in the Patent Office.

Signed and sealed this 3d day of January, A. D., 1905.

[SEAL.]

F. I. ALLEN,
*Commissioner of Patents.* or screws for drawing the said portions together to clamp the said pieces.

4. A box, a corner-stay therefor formed of an outer and an inner angular portion, said portions embracing the adjacent ends of the side and end pieces, a projection on one of said portions, said projection extending between the ends of the side and end pieces so as to substantially reach the other portion, and a bolt or screw passing through the said portions and the said projection to draw the said portions together.

5. A box having the adjacent edges of the side and end pieces substantially square or unbeveled, a corner-stay for the said side and end pieces, said stay having an outer and an inner angular portion between which the adjacent ends of the said pieces are clamped, an inwardly-extending angular projection on the said outer portion, against which the said square edges of the said pieces abut, said projection extending substantially to the inner portion of the corner-stay, and bolts or screws for drawing the said portions together to clamp the said pieces.

6. A box having the adjacent edges of the side and end pieces substantially square or unbeveled, a corner-stay for the said side and end pieces, said stay having an outer and an inner angular portion between which the adjacent ends of the said pieces are clamped, an inwardly-extending angular projection on the said outer portion against which the said square edges of the said pieces abut, bolts or screws for drawing the said portions together to clamp the said pieces, and ridges arranged on the adjacent faces of the said portions, said ridges being staggered in position.

In testimony whereof we affix our signatures in the presence of two witnesses.

GEORGE W. DYARMAN.
JAMES H. PERRIN.

Witnesses:
I. K. DAVIS,
MORA D. BARBER.

---

Correction in Letters Patent No. 760,974.

It is hereby certified that Letters Patent No. 760,974, granted May 24, 1904, upon the application of George W. Dyarman and James H. Perrin, of Columbus, Ohio, for an improvement in "Corner-Stays for Boxes, etc.," was erroneously issued to said Dyarman, Henry H. Dewey, and Colonel E. Bright, whereas said Letters Patent should have been issued to *said Henry H. Dewey and Colonel E. Bright, as sole owners of said invention*, as shown by the record of assignments in this office; and that the said Letters Patent should be read with this correction therein that the same may conform to the record of the case in the Patent Office.

Signed and sealed this 3d day of January, A. D., 1905.

[SEAL.]

F. I. ALLEN,
*Commissioner of Patents.*

It is hereby certified that Letters Patent No. 760,974, granted May 24, 1904, upon the application of George W. Dyarman and James H. Perrin, of Columbus, Ohio, for an improvement in "Corner-Stays for Boxes, etc.," was erroneously issued to said Dyarman, Henry H. Dewey, and Colonel E. Bright, whereas said Letters Patent should have been issued to *said Henry H. Dewey and Colonel E. Bright, as sole owners of said invention,* as shown by the record of assignments in this office; and that the said Letters Patent should be read with this correction therein that the same may conform to the record of the case in the Patent Office.

Signed and sealed this 3d day of January, A. D., 1905.

[SEAL.]

F. I. ALLEN,
*Commissioner of Patents.*